US008818176B2

(12) United States Patent
Seligmann

(10) Patent No.: US 8,818,176 B2
(45) Date of Patent: Aug. 26, 2014

(54) SYSTEM AND METHOD FOR ALIGNING TAGS TO SPECIFIC VIDEO FRAMES

(75) Inventor: Doree Duncan Seligmann, New York, NY (US)

(73) Assignee: Avaya Inc., Basking Ridge, NJ (US)

( * ) Notice: Subject to any disclaimer, the term of this patent is extended or adjusted under 35 U.S.C. 154(b) by 0 days.

(21) Appl. No.: 13/401,083

(22) Filed: Feb. 21, 2012

(65) Prior Publication Data

US 2013/0216201 A1 Aug. 22, 2013

(51) Int. Cl.
*H04N 5/76* (2006.01)
(52) U.S. Cl.
USPC .......................................... 386/283; 386/290
(58) Field of Classification Search
None
See application file for complete search history.

(56) References Cited

U.S. PATENT DOCUMENTS

| | | | | |
|---|---|---|---|---|
| 2007/0292109 | A1* | 12/2007 | Chol et al. | 386/68 |
| 2008/0027921 | A1* | 1/2008 | Chandrasekar et al. | 707/4 |
| 2010/0278514 | A1* | 11/2010 | Mae et al. | 386/248 |
| 2012/0114259 | A1* | 5/2012 | Choi et al. | 382/233 |
| 2013/0071097 | A1* | 3/2013 | Grossman | 386/354 |

\* cited by examiner

*Primary Examiner* — William C Vaughn, Jr.
*Assistant Examiner* — Eileen Adams

(57) ABSTRACT

Disclosed herein are systems, methods, and non-transitory computer-readable storage media for receiving from a user a tag associated with a specific temporal location in video content. The system then aligns the tag associates the tag with the specific temporal location, and if necessary, modifies the video content to be playable directly from that specific temporal location.

20 Claims, 3 Drawing Sheets

SYSTEM AND METHOD FOR ALIGNING TAGS TO SPECIFIC VIDEO FRAMES

BACKGROUND

1. Technical Field

The present disclosure relates to aligning tags to specific video frames and more specifically to aligning tags to intra-coded frames within a video frame sequence.

2. Introduction

With digital video users can tag an event. These tags, which can be tailored to individual preferences, allow users to make specific notes and associate those notes with specific pieces of the video. While tags take many forms, a common trait all tags have in common is being associated with a particular frame of the video. However not all frames of digital video are created equal.

With analog video, each individual video frame contains the entirety of the displayed image. This makes data compression in analog video difficult, while making differentiation between frames depend on a frame rate for the displayed video. With digital video, many of these issues disappear. Digital video utilizes three types of frames: intra-coded frames (or I-frames), predictive coded frames (P-frames), and bi-directionally predictive frames (B-frames). I-frames contain all the information needed to display an entire image, whereas P-frames contains incomplete image data (or none at all) and rely at least partially on information from the previous frame and B-frames rely on information from both the previous frame and the subsequent frame.

At present, as a user places tags into digital video the tags align with the frame corresponding to the moment a user has selected. This frame selected, however, is not always an I-frame. When a user then skips to a specific tag and the specific tag does not align with an I-frame the system either skips backward or skips forward to another I-frame in order to load a complete set of video frame data. Alternatively, the system, rather than skipping backward, can load the data associated with the previous I-frame and the intermediate frames between that I-frame and the location of the specific tag, making it appear that the video began playing precisely with the tagged location. These solutions are not optimal, requiring extra processing prior to playing the tagged video or shifting the starting time of the video.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for aligning tags to specific video frames. A system configured according to this disclosure can receive from a user a tag associated with a specific temporal location in video content. The system can then analyze the video content to identify an I-frame within the video content that is less than a threshold distance from the specific temporal location. If the specific temporal location is an I-frame, the system can simply associate the tag with that location. If, however, the specific temporal location is not an I-frame the system can move an I-frame from another location to the specific temporal location and associate it with the tag, or alternatively, the system can insert a new I-frame at the specific temporal location and associate the new I-frame with the tag.

While some examples set forth herein are addressed to a single tag, the same principles can apply to collections of tags from one or more users as well as automatically generated tags.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure addresses the need in the art for aligning tags to specific video frames. A system, method and non-transitory computer-readable media are disclosed which allow tagging of video content. Specifically, the system aligns tags to specific video frames in the video content. A brief introductory description of a basic general purpose system or computing device in FIG. 1 which can be employed to practice the concepts is disclosed herein. A more detailed description of aligning tags to specific times in the video frames will then follow, accompanied by examples and variations. These variations shall be discussed herein as the various embodiments are set forth. The disclosure now turns to FIG. 1.

Figure 1:
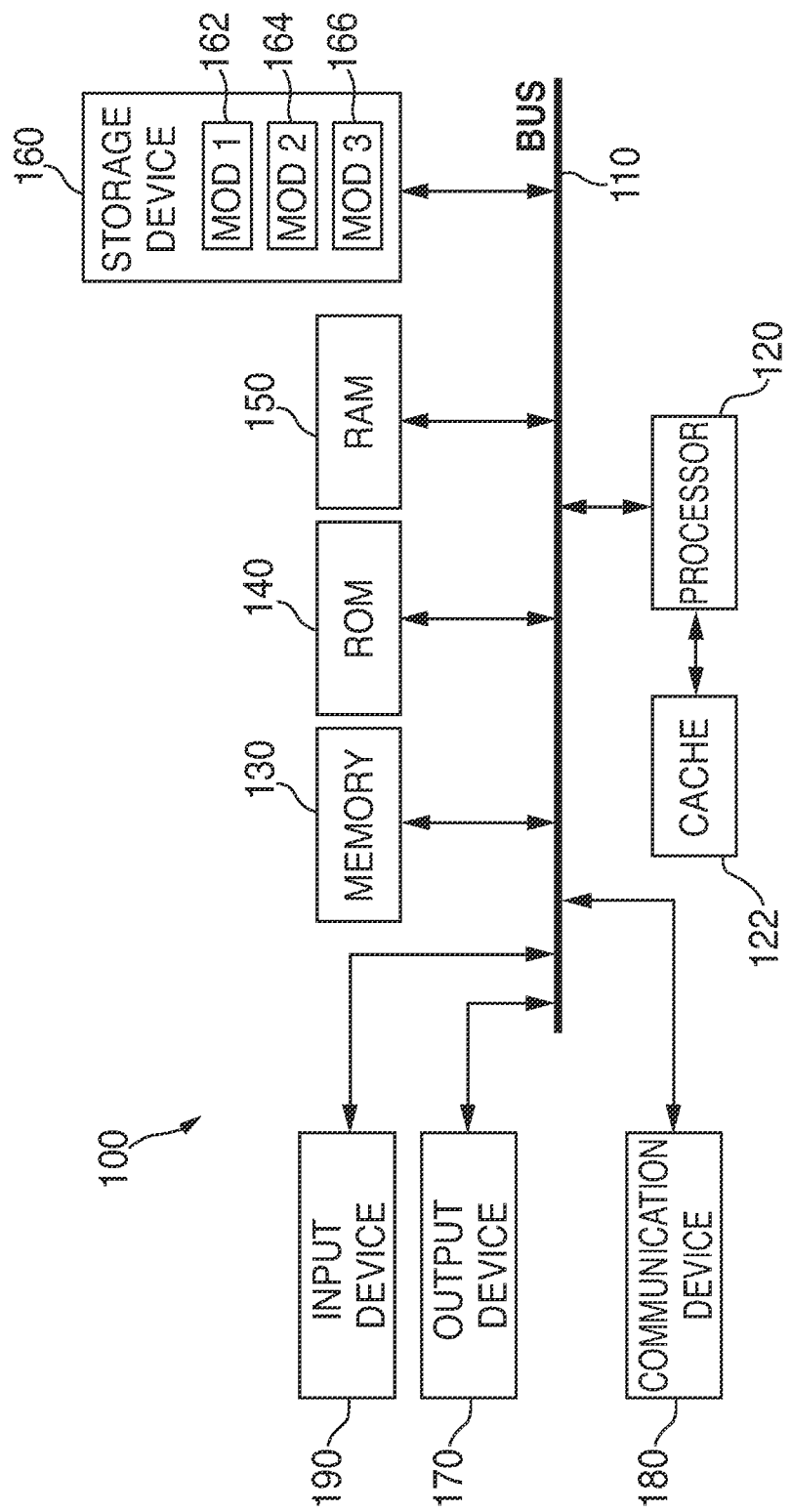
FIG. 1 illustrates an example system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache 122 of high speed memory connected directly with, in close proximity to, or integrated as part of the processor 120. The system 100 copies data from the memory 130 and/or the storage device 160 to the cache 122 for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Figure 2:
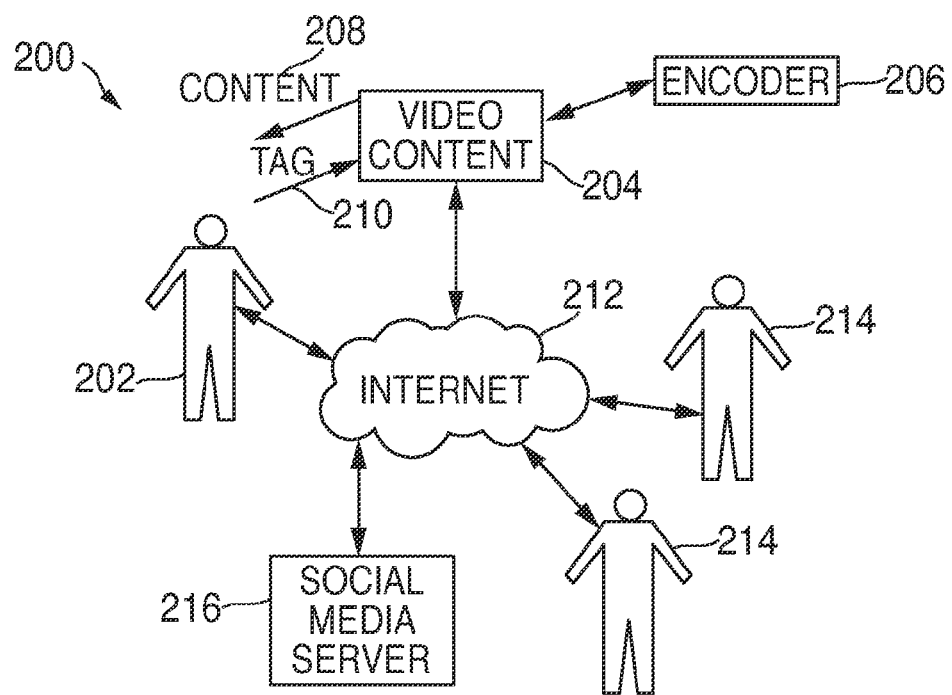
FIG. 2 illustrates an example of a network configuration.

Having disclosed some components of a computing system, the disclosure now returns to a discussion of tagging media content. FIG. 2 illustrates an example of a network configuration 200 that can be employed to practice the concepts. A user 202 receives content 208 from a video content repository 204 or some other source. Examples of video content repositories 204 include servers and computer hard drives, but can include any other storage medium capable of storing video content, as well as streaming video content. The video content repository 204 can communicate with a video encoder 206, but needs not be directly associated as illustrated. As an example, a computer system can have the video content and a program for encoding video content both contained on a single hard drive, or a single desktop computer. Alternatively, the video content can be stored on a server connected to the Internet 212, which could then be connected to the video encoder 206. Cloud-based video encoding can be incorporated as well.

As the user 202 receives the content 208 from the video content repository 204 or live stream, the user 204 tags 210 the video content. As illustrated, the user 202 and/or the user's device communicates this tag 210 back to the video content repository 204, which in turn communicates with the video encoder 206 to create modified video frames with the tag 210 corresponding to the correct moment in the video frame sequence. In other embodiments the user 202 communicates the tag 210 through a network such as the Internet 212 to the video repository 204 or a social media server 216, which in turn communicates the tag to the video repository 204. Additionally, other configurations allow additional users 214 to access the video content repository 204 directly via the Internet 212, as well as social media servers 216. In this manner, if a first user 202 tags a video segment with the purpose of sharing that video with a second user 214, that second user can retrieve the modified video from the video repository 204. Similarly, the first user 202 can place additional tags on videos previously tagged by secondary users 214. The secondary users 214 can have access to the same social media servers 216 as the first user 202, or access to unique social media servers 216. Additionally, the secondary users 214 may have other video encoding 206 utilities than the one used by the first user 202.

The system can assign a timestamp to a tag. The timestamp can be absolute, or can be relative to the media content. For example, an absolute timestamp may be 30 Oct. 2012, 4:32:02 pm Eastern Daylight Time, in whatever time encoding scheme is appropriate. When correlating absolute timestamps to media content, the system can determine a starting time of the media content, and use the difference between the starting time and the absolute timestamp to determine to which moment in the media content the tag should be assigned. Relative timestamps are simpler to correlate to the media content. In an example of a timestamp that is relative to the media content, the timestamp may be 0:14:38 from the beginning of the media content. This means that the tag is assigned to a portion of the media content that is 14 minutes and 38 seconds in to the media content.

Figure 3:
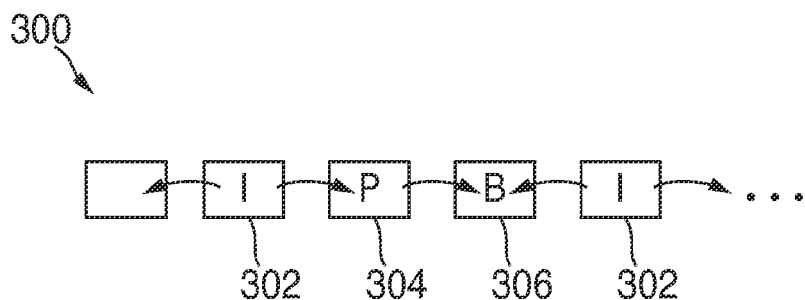
FIG. 3 illustrates an example of video frame variants.

FIG. 3 illustrates an example set of video frames 300. Each block 302, 304, 206 represents a video frame in a sequence of video frames. When received by a media decoder, such as a computer, smartphone, or other media playback device, the information contained within each frame can be decoded and displayed to a user. I-frame 302, represented with an "I", is an intra-coded frame. Intra-coded frames 302 contain all the information necessary to display a frame in media content without requiring information from other frames. While a processor or a hardware and/or software decoder may decompress, recalculate, shift, or otherwise manipulate the information contained within the I-frame 302, information from other frames is not needed to display the image. In certain configurations where an image is relatively static, certain image processing will rely on other frames beyond the I-frame for reasons related to processing or displaying the image. However, this reliance on other frames is not a necessity, but rather a calculated option.

P-frames 304 rely upon a previous frame for at least a portion of the current frame image information. For example, if an I-frame 302 were displayed, and the next frame is the same image shifted to the left twenty pixels, with a new set of twenty pixels appearing to the right of original frame while twenty pixels from the original I-frame 302 are removed from the display, the P-frame 304 would contain the new twenty pixels. Therefore usage of a previous frame, in this case the I-frame 302, is necessary to correctly display the image. B-frames 306 are similar to P-frames 304 in that they rely upon other frames in order to correctly display the image, but whereas P-frames 304 rely only on the previous frame, B-frames 306 rely upon both the previous frame and the subsequent frame in order to correctly display the image. As illustrated, the B-frame 306 relies upon the P-frame 304 immediately preceding it and the I-frame following it. Other frame encoding schemes can be used as well, such as a frame that rely on other frames beyond the immediately preceding and following frames, or such as enhancement frames.

Both P-frames 304 and B-frames 306 have advantages and detriments. While the reduced information can increase data compression and the amount of communicated data necessary for correctly viewing the image, this dependency on additional frames is susceptible to transmission errors, and may reduce the overall image quality. Also, because of the dependency on additional frames, which can be proximate to the current frame or several frames removed from the current frame, latency can occur in processing and computing the current frame.

In addition, the example of video frame variants 300 is a short example of plural frames. The distance between two I-frames is referred to as a Group of Pictures length, or GOP length. Whereas the length illustrated is 3, other common lengths are 12, 15, and 18 frame spaces between I-frames. The actual distance between I-frames can be any other number, and can be significantly higher than 18 frames, such as every 10 seconds which, for 24 frame-per-second media, would be every 240 frames. Groups of Pictures, the frames between I-frames, can be homogenous, such as only P-frames or only B-frames. Alternatively, they can contain a mixture of P-frames and B-frames.

Figure 4:
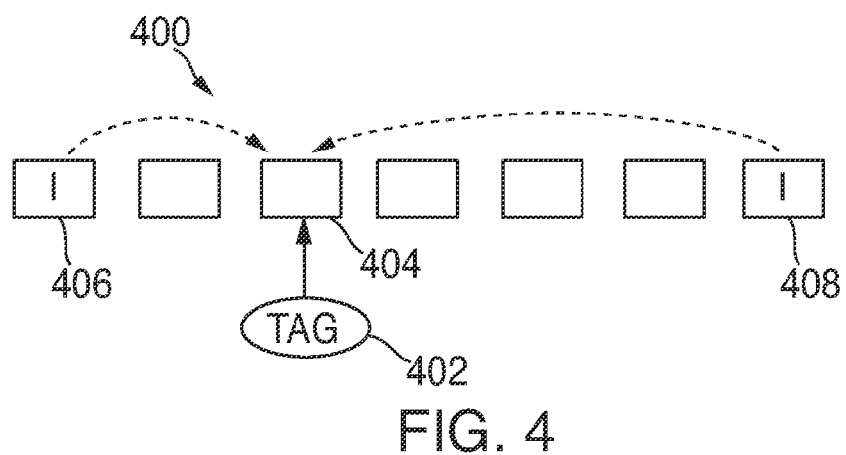
FIG. 4 illustrates an exemplary embodiment.

With this background, FIG. 4 illustrates an exemplary embodiment 400. As illustrated within a series of video frames is a group of pictures with two I-frames 406 and multiple frames between the I-frames 406. The user has created a tag 402 at a particular time, and the system can place the tag at a specific temporal location 404 within the group of pictures 400. The system can determine the temporal location of the tag based on when the tag was created, when it was submitted, an indication from the user, and/or other factors. Upon identifying the specific temporal location 404, the system identifies nearby I-frames 406, 408. If the specific temporal location 404 is an I-frame, the system can simply assign the tag 402 to that I-frame or specific temporal location. However, as illustrated the specific temporal location 404 does not coincide with an I-frame.

Because the specific temporal location 404 does not coincide with an I-frame, the system manipulates at least one of the tag and the media content such that the tag coincides with an I-frame. For example, the system can either (1) move an I-frame 406, 408 from another location to the specific temporal location 404 desired, (2) insert a new I-frame at the specific temporal location, or (3) move the tag to an existing I-frame. In determining whether to move an I-frame, insert a new I-frame, and/or move the tag, the system can perform an analysis comparing the distance between the specific temporal location and the nearest I-frame. In an example analysis, the system searches for both the preceding I-frame and the succeeding I-frame of the specific temporal location and calculates their respective distances. As illustrated, the I-frame preceding the specific temporal location is 2 frames away, while the succeeding I-frame is 4 frames away. Based on this information, the system determines which option of moving the preceding I-frame, moving the succeeding I-frame, or inserting a new I-frame best meets current system needs/requirements. In yet other circumstances, the system can determine that moving an alternative I-frame, not an I-frame directly preceding or succeeding the specific temporal location, best fulfills system requirements. Should the system determine that insertion of a new I-frame at the specific temporal location is the most desirable option, the system can replace the video frame associated with the specific temporal location with an I-frame. In yet another option, the system performs a content-based analysis of the image content of the various frames to determine whether a favorable position in to which an I-frame may be inserted is closer to the tag than an existing I-frame, and, if so, the system can insert an I-frame into that position and move the tag to that position.

Figure 5:
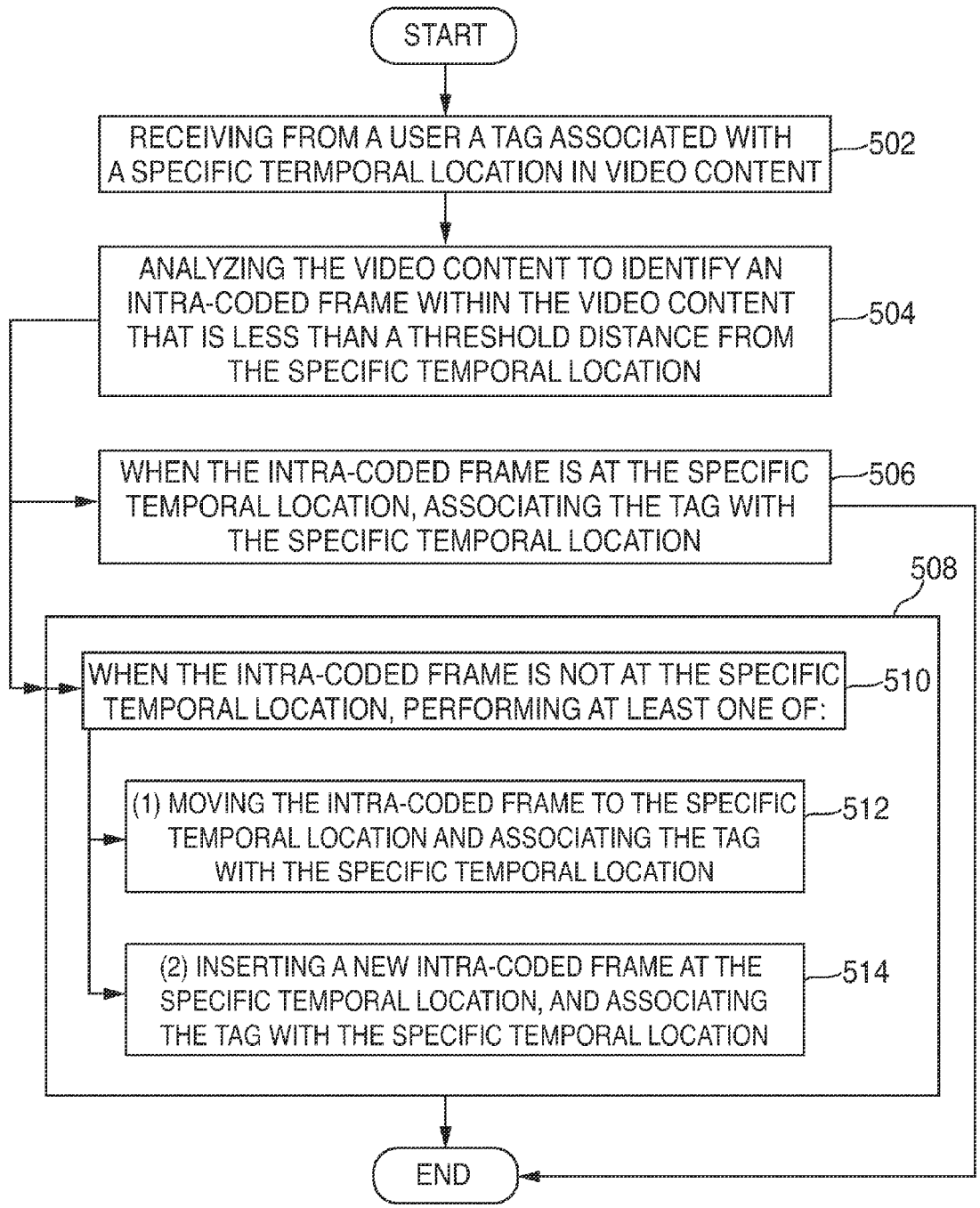
FIG. 5 illustrates an example method embodiment.

Having disclosed some basic system components and concepts, the disclosure now turns to the exemplary method embodiment shown in FIG. 5. For the sake of clarity, the method is discussed in terms of an exemplary system 100 as shown in FIG. 1 configured to practice the method. The steps outlined herein are exemplary and can be implemented in any combination thereof, including combinations that exclude, add, or modify certain steps.

The system 100 receives from a user a tag associated with a specific temporal location in video content (502). The tag can be a hashtag, text, a contact, a social network post, a transcription of a spoken utterance, an instant message, a calendar entry, and/or other information, including user-generated tags and automatically generated tags. Automatically generated tags can be determined from Twitter® posts, news aggregation, specific utterances, or analysis of meetings using metrics such as speaker turns, meeting join/leave, and meeting termination. The system 100 then analyzes the video content to identify an intra-coded (I-frame) within the video content that is less than a threshold distance from the specific temporal location (504). When the intra-coded frame is at the specific temporal location, associating the tag with the specific temporal location (506). Alternatively (508), when the intra-coded frame is not at the at the specific temporal location, performing at least one of (510): (1) moving the intra-coded frame to the specific temporal location and associating the tag with the specific temporal location (512) and (2) inserting a new intra-coded frame at the specific temporal location, and associating the tag with the specific temporal location (514). In determining whether to move the intra-coded frame (512) or insert a new intra-coded frame (514), the system 100 can perform an analysis to determine if the nearest intra-coded frame is beyond a certain time threshold, or beyond a certain number of frames from the specific temporal location. If the system 100 determines to insert a new intra-coded frame (514), in various circumstances this requires creating an intra-coded frame at the specific temporal location.

The tag received can be a hashtag beginning with a "#" character, or can be text, contact information, pictures, audio annotations, or other tag formats. In many configurations the user will specify the specific temporal location within the video where the tag should align. However, in other configurations the specific temporal location is determined using an average of tag locations belonging to other users. The user, or others having access to the video content, can then search the video for the received tag. The video content, encoded using MPEG-2, MPEG-4, H.264 standards, or other video standards, can then be re-encoded to integrate the tag into the video. Alternative, the video content and the tag can be separately encoded, but temporally aligned.

Users can tag live streams of media which are encoded on the fly. The system can correlate those tags associated with a live stream with a separately encoded copy of the media. Thus, the user views the media and generates tags in real time. However, the streamed media content is encoded at a later time, such as after the event is over, and the system can modify the tags and/or the content after the live stream.

In one variation, the system stores the tags in a separate tag database which is associated with the media. Then, a media playback device can play back the media with the tags retrieved from the tag database. Alternatively, the tags can be embedded as supporting data for the media content, such as metadata or closed caption data.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

I claim:

1. A method comprising:
receiving, from a user, a user-specified temporal location in video content, wherein the user-specified temporal location is not within an intra-coded frame that contains sufficient information to display an image without requiring information from other frames;
analyzing, via a processor, the video content to identify a nearest intra-coded frame relative to the user-specified temporal location in the video content by comparing a first intra-coded frame before the user-specified temporal location and a second intra-coded frame after the user-specified temporal location and selecting the nearest intra-coded frame between the first intra-coded frame and the second intra-coded frame; and tagging the video content by performing one of:
   (1) moving the nearest intra-coded frame to the user-specified temporal location in the video content and associating a tag with the nearest intra-coded frame;
   (2) inserting a new intra-coded frame at the user-specified temporal location of the video content and associating the tag with the new intra-coded frame; and
   (3) associating the tag with the nearest intra-coded frame.

2. The method of claim 1, wherein the nearest intra-coded frame is moved to the user-specified temporal location when a distance corresponding to spacing between the nearest intra-coded frame and the user-specified temporal location is above a threshold distance.

3. The method of claim 1, wherein inserting the new intra-coded frame comprises creating a new intra-coded frame.

4. The method of claim 1, further comprising determining the user-specified temporal location based on an average of temporal locations of tags of other users.

5. The method of claim 1, wherein the user can search tags in the video content.

6. The method of claim 1, wherein the video content is encoded using one standard of MPEG-2, MPEG-4, or H.264.

7. The method of claim 1, wherein the tag comprises one of a hashtag, a text, a picture, a contact, or a link.

8. A system, comprising:
   a processor; and
   a computer-readable storage device storing instructions which, when executed by the processor, cause the processor to perform operations comprising:
      receiving a user-specified temporal location in video content, wherein the user-specified temporal location is not within an intra-coded frame that contains sufficient information to display an image without requiring information from other frames;
      analyzing the video content to identify a nearest intra-coded frame relative to the user-specified temporal location in the video content by comparing a first intra-coded frame before the user-specified temporal location and a second intra-coded frame after the user-specified temporal location and selecting the nearest intra-coded frame between the first intra-coded frame and the second intra-coded frame; and
      tagging the video content by performing one of:
         (1) moving the nearest intra-coded frame to the user-specified temporal location in the video content and associating a tag with the nearest intra-coded frame;
         (2) inserting a new intra-coded frame at the user-specified temporal location of the video content and associating the tag with the new intra-coded frame; and
         (3) associating the tag with the nearest intra-coded frame.

9. The system of claim 8, wherein the nearest intra-coded frame is moved to the user-specified temporal location when a distance corresponding to spacing between the nearest intra-coded frame and the user-specified temporal location is above a threshold distance.

10. The system of claim 8, wherein inserting the new intra-coded frame comprises creating a new intra-coded frame.

11. The system of claim 8, wherein the computer-readable storage device stores additional instructions which, when executed by the processor, cause the processor to perform a further operation comprising determining the user-specified temporal location based on an average of temporal locations of tags of other users.

12. The system of claim 8, wherein a user can search tags in the video content.

13. The system of claim 8, wherein the video content is encoded using one standard of MPEG-2, MPEG-4, and H.264.

14. The system of claim 8, wherein the tag comprises one of a hashtag, a text, a picture, a contact, and a link.

15. A computer-readable storage device storing instructions which, when executed by a processor, cause the processor to perform operations comprising:
   receiving, from a user, a user-specified temporal location in video content, wherein the user-specified temporal location is not within an intra-coded frame that contains sufficient information to display an image without requiring additional information from other frames;
   analyzing the video content to identify a nearest intra-coded frame relative to the user-specified temporal location in the video content by comparing a first intra-coded frame before the user-specified temporal location and a second intra-coded frame after the user-specified temporal location and selecting the nearest intra-coded frame between the first intra-coded frame and the second intra-coded frame; and
   tagging the video content by performing one of:
      (1) moving the nearest intra-coded frame to the user-specified temporal location in the video content and associating a tag with the nearest intra-coded frame;
      (2) inserting a new intra-coded frame at the user-specified temporal location of the video content and associating the tag with the new intra-coded frame; and
      (3) associating the tag with the nearest intra-coded frame.

16. The computer-readable storage device of claim 15, wherein the nearest intra-coded frame is moved to the user-specified temporal location when a distance corresponding to spacing between the nearest intra-coded frame and the user-specified temporal location is above a threshold distance.

17. The computer-readable storage device of claim 15, wherein inserting the new intra-coded frame comprises creating a new intra-coded frame.

18. The computer-readable storage device of claim 15, storing additional instructions which, when executed by the processor, cause the processor to perform further operations comprising determining the user-specified temporal location based on an average of temporal locations of tags of other users.

19. The computer-readable storage device of claim 15, wherein the user can search tags in the video content.

20. The computer-readable storage device of claim 15, wherein the video content is encoded using one standard of MPEG-2, MPEG-4, and H.264.

* * * * *